Aug. 19, 1941.    A. J. HERSEY ET AL    2,253,330
VEHICLE
Filed May 1, 1939    9 Sheets-Sheet 4

Inventors
Arthur J. Hersey and
Charles L. Madden

Aug. 19, 1941.  A. J. HERSEY ET AL  2,253,330
VEHICLE
Filed May 1, 1939   9 Sheets-Sheet 5

Inventors
Arthur J. Hersey and
Charles L. Madden

Inventors
Arthur J. Hersey and
Charles L. Madden

Patented Aug. 19, 1941

2,253,330

UNITED STATES PATENT OFFICE 2,253,330

VEHICLE

Arthur J. Hersey and Charles L. Madden, Minneapolis, Minn.

Application May 1, 1939, Serial No. 270,990

9 Claims. (Cl. 105—182)

Our invention relates to improvements in vehicles and particularly, though not exclusively, to self-propelled rail cars adapted, among other things, for switching purposes and for carrying mail, passengers, express and freight, and also for hauling other cars, especially over the shorter railway lines.

An object of the invention is to provide a vehicle having a simple and durable four-wheel truck of flexible construction in which the four wheels are caused equally to share the burden of the load imposed upon the truck, a further object of the invention being to provide such a flexible truck construction in which all of the wheels are efficiently driven and the tractive effort distributed therebetween in an effective and practical manner.

Another object of the invention is to provide a truck, as above, which is adapted to swivel relative to the vehicle frame, a further object being to provide such swiveling truck construction, whereby a pair of drive trucks may be advantageously employed in a vehicle with each truck of the pair close-coupled to a common power member.

An additional object of the invention is to supply a traction vehicle having a drive truck with two axles, in which truck one axle is connected with the source of power through gearing and the other axle is employed as an anchorage for torque resisting means associated with said gearing.

Another object of the invention is to provide a vehicle employing a universally flexible truck and in which frame supporting springs serve yieldingly to damp and limit the flexing of said truck.

A further object of our invention is to provide in a vehicle structure of the present nature novel and efficient draft means for connecting the flexible truck with the vehicle frame independently of the frame supporting springs.

Other objects of the invention reside in the novel combination and arrangement of parts and in the details of construction hereinafter illustrated and/or described.

In the drawings, Fig. 13 is a side elevational view of a self-propelled rail car embodying our invention, said car being equipped with a pair of swiveling drive trucks having close-coupled driving connections with a common power member.

Figures 1, 4:
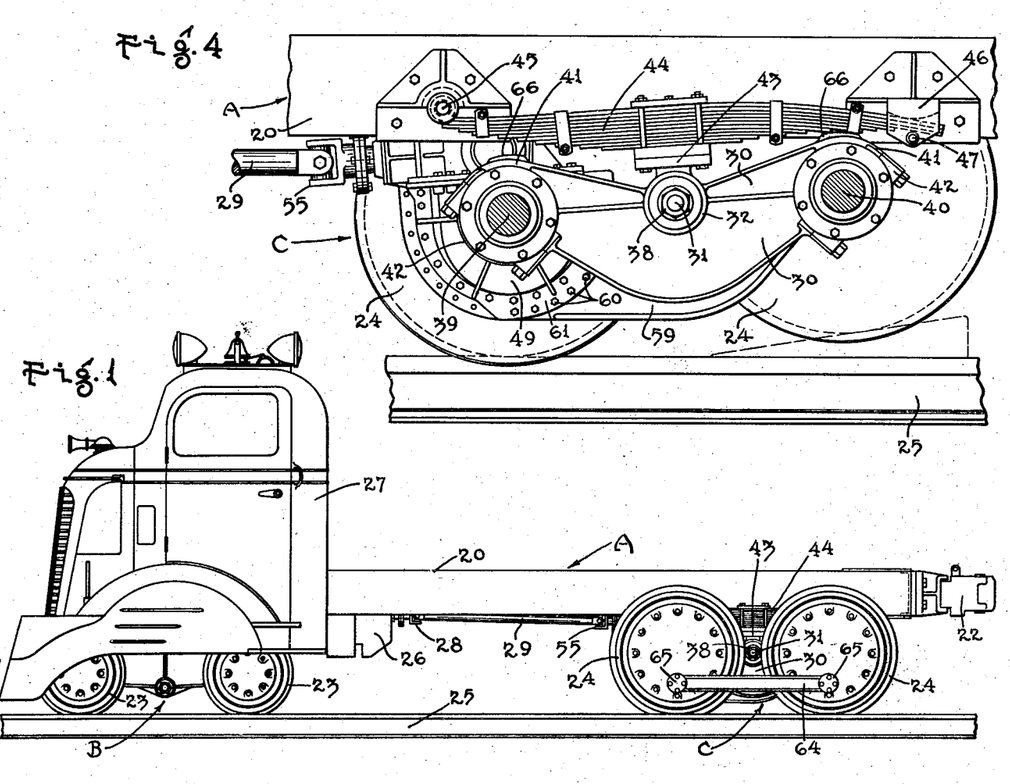
Fig. 1 is a side elevational view of a rail car constituting an embodiment of our invention, said car having a single drive truck with frame supporting springs shackled to the car frame.
Fig. 4 is a vertical sectional view taken as on the line 4—4 of said Fig. 2 and also including a rear portion of the car frame, the truck being shown as tilted against the action of and to the limit permitted by frame supporting springs.
Figure 2:
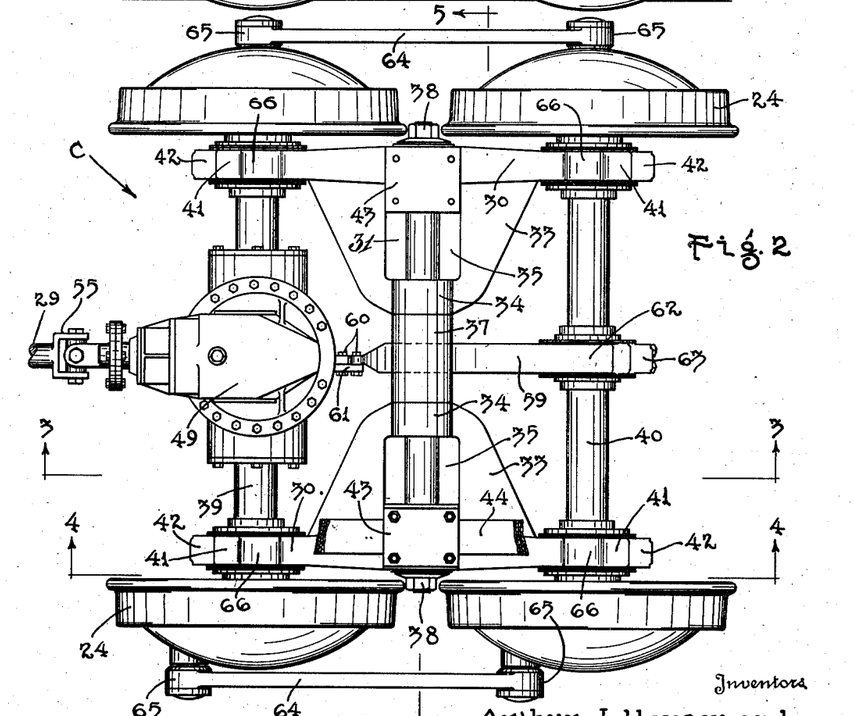
Fig. 2 is a plan view of the truck shown in Fig. 1.

Reference being had to the drawings, wherein similar reference characters designate similar parts throughout the several views, attention is first invited to the rail car construction illustrated in Figs. 1 to 7 inclusive. The structure shown in said Fig. 1 is a self-propelled rail car having a frame A including side beams 20 and cross beams 21, said frame being supplied at the rear thereof with a suitable car coupler 22. Supporting the car frame A is a pilot truck B and a drive truck C, said pilot truck being conventionally swiveled to said frame A. Wheels 23 and 24 of said trucks B and C are flanged and ride on rails 25. Carried by the car frame A is an internal combustion engine (not shown), an associated power transmitting mechanism of usual construction, indicated at 26, and a suitably designed engineer's cab 27. Said power transmitting mechanism 26 includes a power take-off member in the form of a universal joint 28 to which a propeller shaft 29 is conventionally splined for telescoping action. Since no claim is made specifically to the pilot truck B, engine cab 27 or power transmitting mechanism 26 of the vehicle, no further description thereof will be necessary.

The drive-truck C has two side frame members 30 connected together by a tie-shaft 31, said frame members 30 being journaled on said shaft 31 and free, save as hereinafter explained, to tilt about said shaft independently of each other. For journaling the side frame members 30 on the tie-shaft 31, each of said members is formed intermediately thereof with a bearing boss 32 through which said shaft 31 extends. Integrally formed with each side frame member 30 is an inwardly extending brace-plate 33 formed at its inner end with a bearing boss 34 which revolubly receives the tie-shaft 31, said brace-plate 33 being slotted, as at 35, between said bearings 32 and 34 and reinforced by flanges 36 along said slot. Located between the inner bearings 34 on the brace-plates 33 of the two side frame members 30 and revolubly disposed on the tie-shaft 31 is a spacing sleeve 37. The described assembly consisting of said side frame members 30, tie-shaft 31 and spacing sleeve 37 is held together by means of nuts 38 fitted on the threaded ends of the tie-shaft 31 and abutting against the outer faces of the outer bearings 32 of the side frame members 30.

Journaled in the truck frame C at the opposite ends thereof are axles 39 and 40, each having the flanged wheels 24 fixed to its ends, the first noted axle 39 being herein referred to as a drive axle, and the second noted axle 40 being referred to as a live axle. To provide for the journaling of said axles in the truck frame C, each end of each frame member 30 is constructed with a bearing 41 of split formation including a cap 42 and self-aligning roller bearing elements (not shown) of well-known construction. Each set of flanged wheels 24 at either side of the truck frame, the one wheel on axle 39 and the other on axle 40, ride one of the rails 25 of the track over which the rail car travels.

Cast integrally with and surmounting the outer bearing 32 on each truck frame member 30 is a plate-like spring seat 43. Mounted upon each spring seat 43 is a leaf spring 44, the two springs 44 of the drive truck structure being disposed at opposite sides of the rear portion of the car frame A and serving to support the same. The forward end of each spring 44 is pivotally clipped or shackled to a stud 45 extending outwardly from its respective side beam 20 of the car frame A, while the rear end of each spring 44 is slidably saddled by a bracket 46 secured to the same side beam 20 and fitted with a retaining pin 47 underlying and serving to keep said rear end of the spring 44 in place within the bracket 46.

The propeller shaft 29 is coupled with gearing carried by and functioning to turn the drive axle 39 of the truck C. This gearing includes a spur gear 48 (Figs. 6 and 7) keyed to the drive axle 39, said gear 48 being enclosed in a gear case 49 journaled on said axle 39, said case having a counter-shaft 50 and a stub-shaft 51 journaled therein. The counter-shaft 50 carries a spur gear 52 in mesh with the spur gear 48 on the drive axle 39 and also carries a bevel gear 53 which meshes with a bevel gear 54 on the stub-shaft 51. Said stub-shaft 51 projects from the gear case 49 and is connected to the propeller shaft 29 by means of a universal joint 55. Roller bearings, shown at 56, 57 and 58, are preferably employed in journaling the gear case 49 on the drive axle 39 and in journaling the counter-shaft 50 and stub-shaft 51 in said gear case.

To keep the gear case 49 from turning on the drive axle 39, we provide a torque arm 59 which extends from said gear case 49 to the live axle 40 and underreaches the tie-shaft 31 of the truck C. This torque arm 59 is fastened at the one end by bolts 60 to an attaching flange 61 on the gear case 49, the other end of said torque arm 59 having a split bearing 62 connecting the same with the live axle 40, such bearing including a cap 63 and having incorporated therein self-aligning roller bearing members of the same nature as the bearings 41 at the ends of the frame members 30 of the truck.

Rotation of the drive truck axle 39, by the propeller shaft 29, through the medium of the gearing housed within the gear case 49, results in driving the wheels 24 secured to said drive axle 39. To employ the wheels 24 on the live axle 40 as drive wheels, we connect each set of wheels at either side of the truck with tie-rods 64, the connection between each wheel and its respective tie-rod 64 embodying a self-aligning bearing 65 of familiar construction requiring no detailed description.

Figure 3:
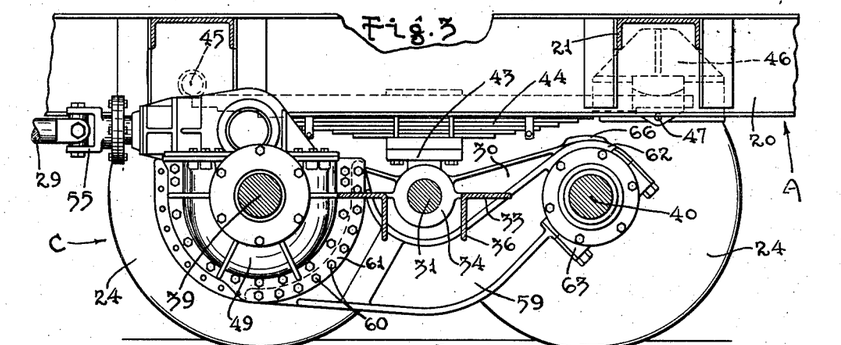
Fig. 3 is a vertical sectional view taken as on the line 3—3 of Fig. 2 and including a rear portion of the car frame.
Figure 5:
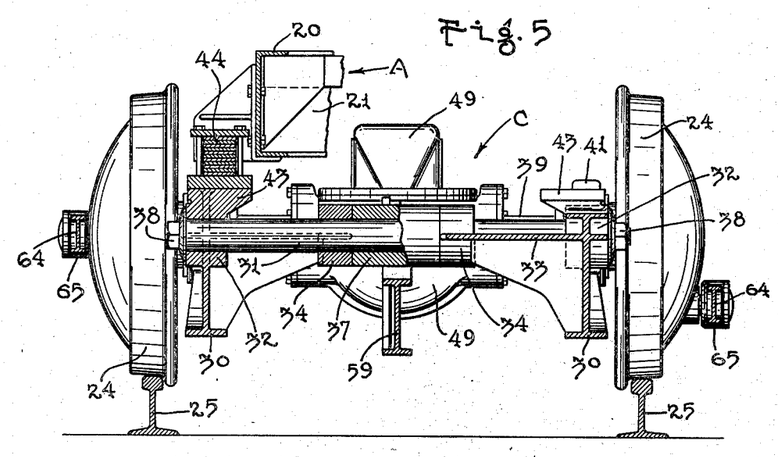
Fig. 5 is a further view of said truck, said view including a portion of the car frame and being taken in vertical section as on the line 5—5 of said Fig. 2.
Figure 6:
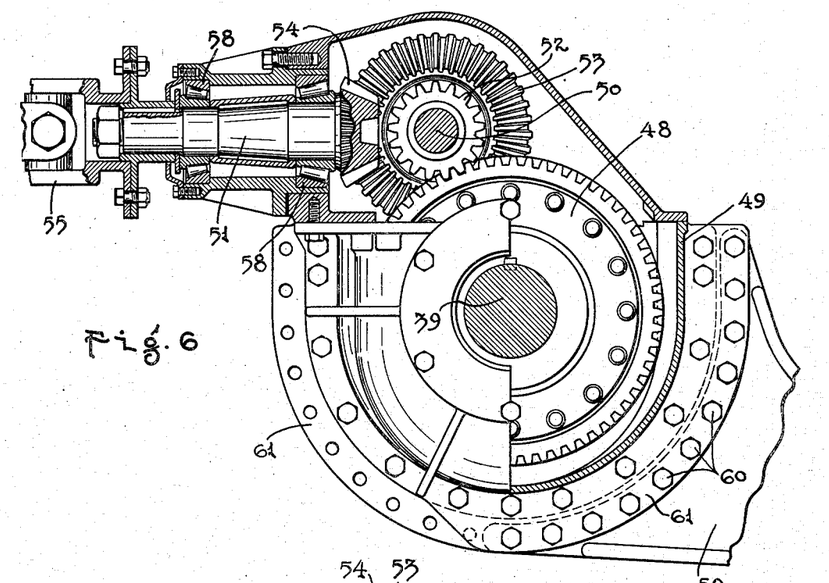
Figs. 6 and 7 are detail views illustrating encased gearing for driving an axle of the truck, Fig. 6 being a view, principally in section, taken transversely of such axle and Fig. 7 being a similar view, principally in section, but taken longitudinally of the axle.
Figure 7:
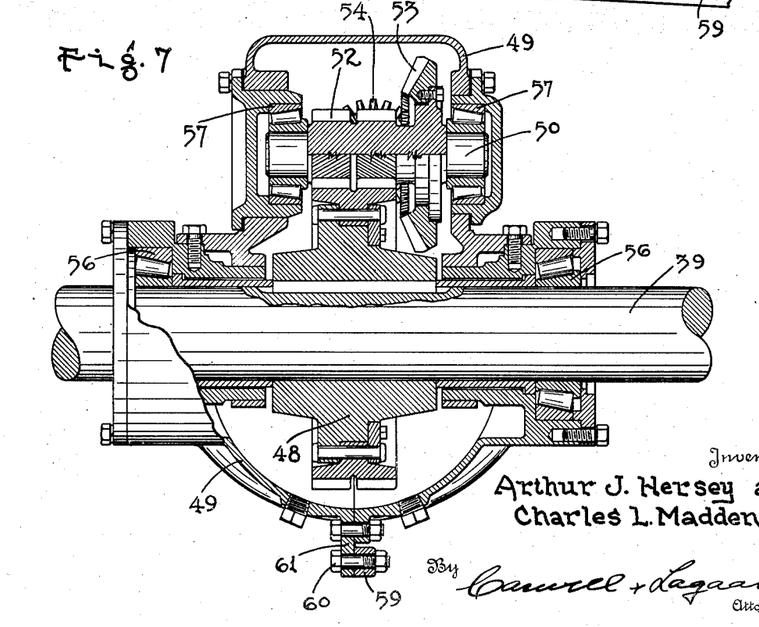

Since the side frame members 30 of the truck C are independently tiltable, since the axles 39, 40 are journaled in said frame members in self-aligning bearings 41; since the connection between the torque arm 59 and the live axle 40 embodies a self-aligning bearing 62, and since the connections between the tie-rods 64 and the wheels 24 are effected through self-aligning bearings 65, it will be understood that the truck structure as hereinabove described, is universally flexible and that the four wheels 24 ride their respective rails 25 of a track with the weight of the load on the truck substantially equally distributed between said four wheels. All of the wheels 24 being drive wheels, substantially the same tractive effort is exerted by each thereof, except for the variation existing, not between the wheels on the same axle, but between wheels on the different axles when the application of power to the driving axle 39 is reversed. In propelling of the drive axle 39 in a counter-clockwise direction as seen in Fig. 3, the difference in tractive effort is in favor of the wheels 24 on the live axle 40 because of the downwardly exerted leverage of the torque arm 59 on said live axle 40. Conversely, upon propelling the drive axle 39 in a clockwise direction as seen in Fig. 3, the difference in tractive effort is in favor of the wheels 24 on said drive axle 39 by reason of the reversal of the leverage as effected in said torque arm 59. However, in either case, the power furnished to the truck C is fully expended in tractive effort, except for the minor frictional losses.

The flexing of the drive truck C is yieldingly restrained by the frame supporting springs 44. Each such spring 44 being rigidly secured to its respective spring seat 43 and each such seat being integral with its respective tiltable truck frame member 30, it follows that any tilting of either of the frame members 30 is restrained or damped by its respective frame supporting spring 44 which must be flexed more or less to accommodate such tilting movement. It will thus be understood that, though flexible to maintain equal weight distribution between the wheels 24, the truck C is stable and quiet in travel and not normally susceptible to derailment.

In case of the derailment of the drive truck C or subjection of the same to other abnormal condition wherein the flexing of the truck structure would be apt, even against the restraining action of the frame supporting springs 44, to carry beyond normal limits, there would be danger of injury to one or the other or both of the universal joints 28, 55 on the propeller shaft 29 or to one or the other or all of the self-aligning bearings 41, 62 and 65 respectively provided on the truck frame members 30, the torque arm 59 and the tie-rod 64. This danger is eliminated in a simple manner as will be readily understood by reference to Fig. 4, wherein one end of one of the frame supporting springs 44 is shown functioning as a yielding limit stop for the corresponding end of the corresponding frame member 30 of the truck. Any tilting of either of said frame members 30 that would extend beyond the limit of tolerance afforded in the universal joints 28, 55 and/or self-aligning bearings 41, 62 and/or 65 is yieldingly arrested by the engagement of one or more of the ends of the truck frame members 30 with its or their respective spring or springs 44. At the various points on the truck frame members 30 where said members engage the springs 44, we have provided buffer bosses 66.

Figure 8:
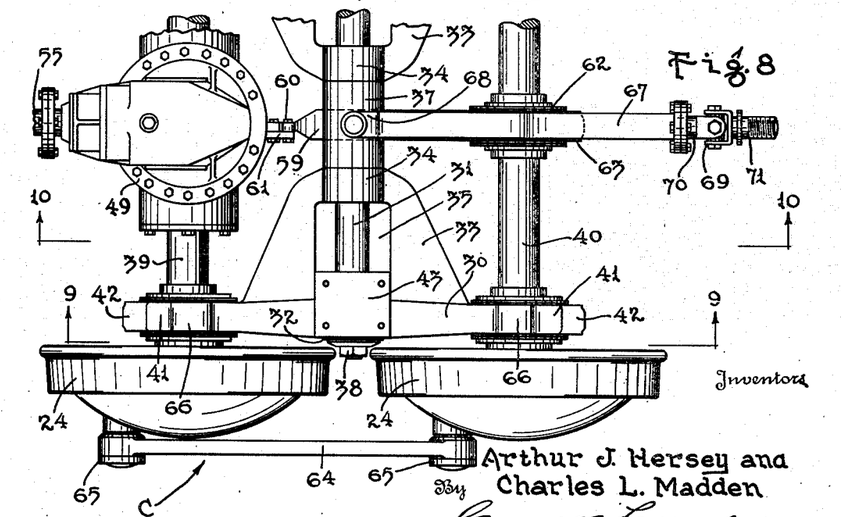
Fig. 8 is a fragmentary view of a form of drive truck construction adapted to be used with unshackled frame supporting springs, said form of truck embodying a drawbar or radius rod for tying the truck to the car frame.
Figure 9:
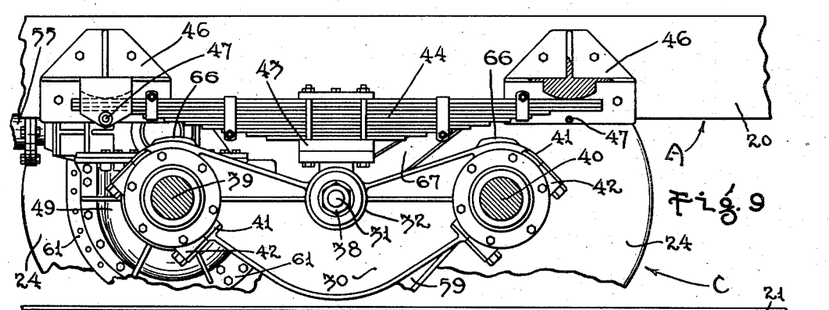
Fig. 9 is a vertical sectional view taken as on the line 9—9 of Fig. 8, said view including a portion of the car frame in elevation and showing one of the unshackled frame supporting springs.
Figure 10:
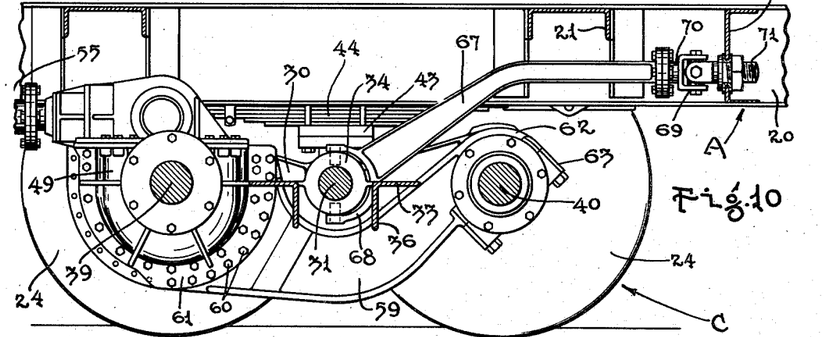
Fig. 10 is a vertical sectional view taken as on the line 10—10 of said Fig. 8, a portion of the car frame being included and also a detailed representation of a drawbar or radius rod tying the truck to said frame.

An application of our invention in a form somewhat similar to that shown in Figs. 1-7, is shown in Figs. 8-10, the latter application differing from the first noted application in the draft means provided between the drive truck C and car frame A. In said latter application of the invention, the front end of each frame supporting spring 44, as well as the rear end thereof, is ridden by saddle bracket 46, which construction affords no impediment to relative forward or backward movement between the drive truck C and car frame A. To prevent such relative movement and link said truck to said frame, we employ a drawbar 67 which extends rearwardly from the spacer-sleeve 37 on the tie-shaft 31 of the truck to a cross beam 21 of the car frame A. The connection between said drawbar 67 and spacer-sleeve 37 includes a yoke 68 on the drawbar 67, the branches of said yoke embracing the sleeve 37 and being vertically trunnioned thereto. The connection between said drawbar and cross beam 21 includes a universal joint 69, the one stud 70 thereof being bolted to the rear end of the drawbar 67 and the other stud 71 being swiveled horizontally in said cross-beam 21. With the drawbar 67 trunnioned at one end to the sleeve 37, which is free to turn on the tie-shaft 31 of the truck C, and connected at its other end to a beam 21 of the car frame A through the universal joint 69 swivelly fastened to said beam, said drawbar 67 readily accommodates itself to all of the relative movements between truck C and frame A that are normally encountered in practice. Like the self-aligning bearings 41, 62, and 65 respectively provided for the truck frame members 30, the torque arm 59 and the tie-rods 64, said connections joining said drawbar 67 with the spacer-sleeve 37 and cross frame beam 21 are not endangered by any necessity of accommodation beyond their normal limits, such protection, as hereinbefore indicated, residing in the provision whereby the frame supporting springs 44 constitute limit stops for the frame members 30 of the truck C.

Figure 11:
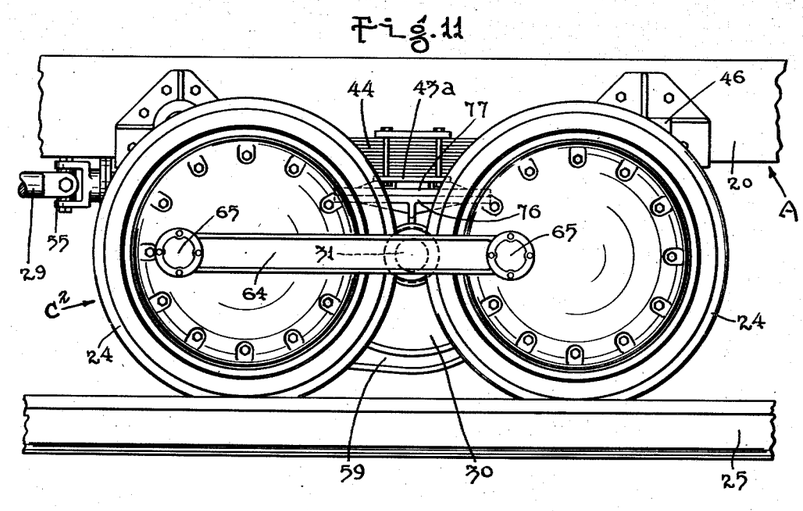
Fig. 11 is a side elevational view of a portion of a rail car frame equipped with a swiveling truck in embodiment of our invention.
Figure 12:
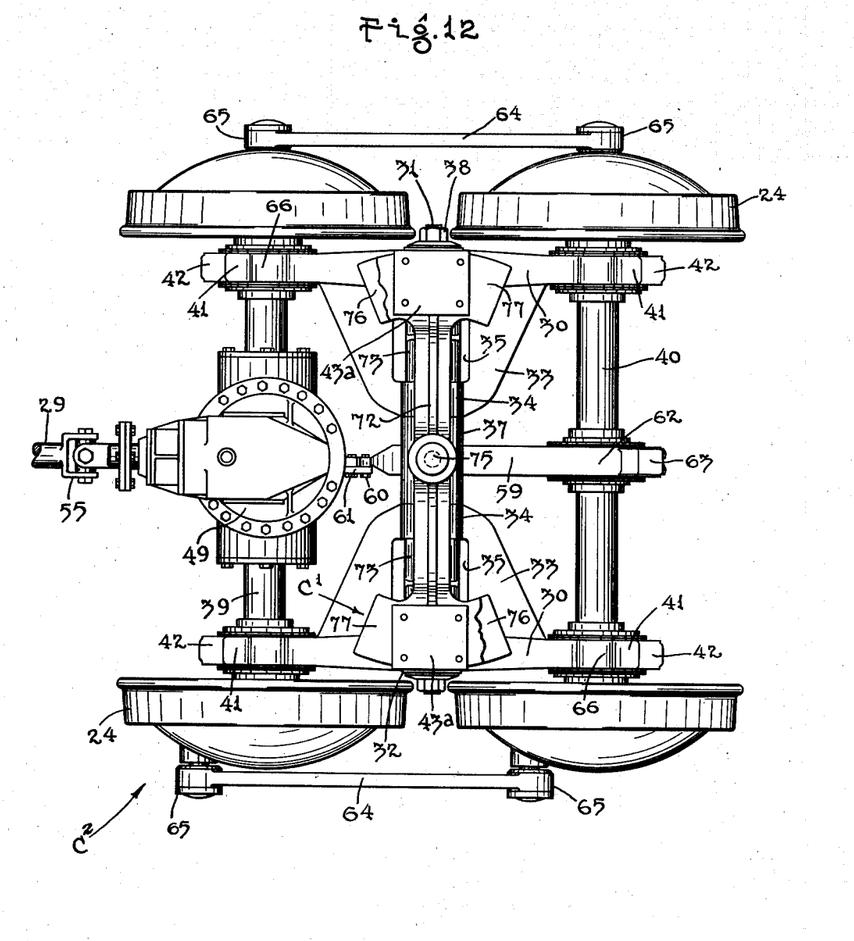
Fig. 12 is plan view in detail of said swiveling truck.

For certain uses it is advantageous to modify the first noted application of our invention (Figs. 1-7) so that the drive truck C may swivel relative to the car frame A. One embodiment of such modification is of advantage in a rail car of relatively long wheel-base and which may be used on tracks of sharp curvature (Figs. 11 and 12). Another embodiment of such modification is advantageous in a switch-car of relatively short wheel-base having, in the stead of a pilot truck, a second drive truck, the two drive trucks being close-coupled through relatively short propeller shafts to a common power element located between said drive trucks (Figs. 13-17).

Referring now to Figs. 11-17, it is to be noted that the bearings 32 in the side frame members 30 of the truck do not have spring seats, such as 43 previously described (Fig. 5), formed integrally therewith. Instead, seats 43$^a$ for the frame supporting springs 44 are incorporated in a fifth wheel structure C$^1$ by virtue of which relative swiveling movement between the drive truck C$^2$ and car frame A is permitted. This fifth wheel structure includes an arched reach 72 formed at its ends with sleeve-like bearings 73 journaled on the tie-shaft 31; one bearing 73 being accommodated in the slot 35 in the brace-plate 33 of one side frame member 30 of the truck and the other bearing 73 being accommodated in the slot 35 in the brace-plate 33 of the other side frame member 30. Said arched reach 72 bridges over the inner bearings 34 of said side frame members and also the spacer-sleeve 37, leaving a substantial vertical space between the center of said reach and said spacer-sleeve 37 therebeneath. Surmounting the arched reach 72 is a yoke 74 which is horizontally pivoted to the center of said reach by a king bolt 75. The reach 72 has plate-like quadrants or lower circle portions 76 formed integrally therewith, one at either end thereof. Slidably bearing upon these lower circle portions 76 are plate-like quadrants or upper circle portions 77, one of which is formed at one end of the yoke 74 and the other of which is formed at the other end of said yoke. Cast integrally with each of the upper circle portions 77 is a spring seat 43$^a$ to which one of the frame supporting springs 44 is bolted, the two springs 44 occupying positions at opposite sides of the side beams 20 of the car frame A and being fastened thereto, as in the first described application of the invention (Fig. 4).

Figure 14:
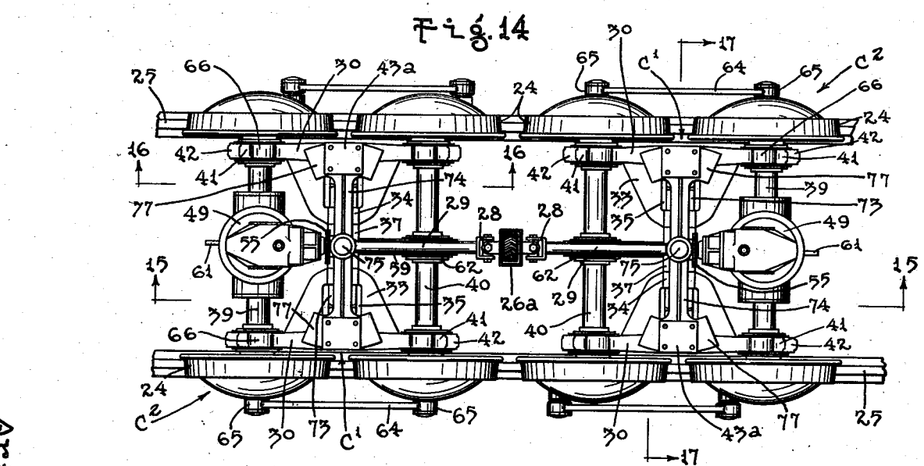
Fig. 14 is a plan view in detail of the trucks shown in Fig. 13.
Figure 15:
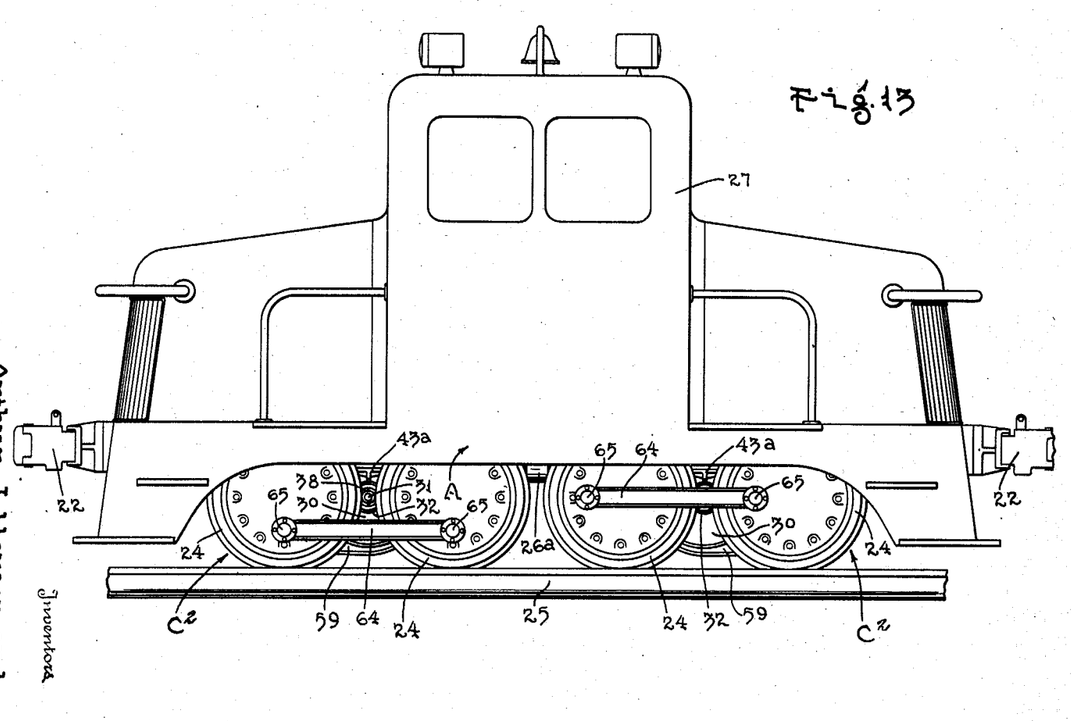
Fig. 15 is another view of the same trucks and the car frame portion surmounting them, said Fig. 15 being in vertical section and taken as on the line 15—15 of Fig. 14.
Figure 16:
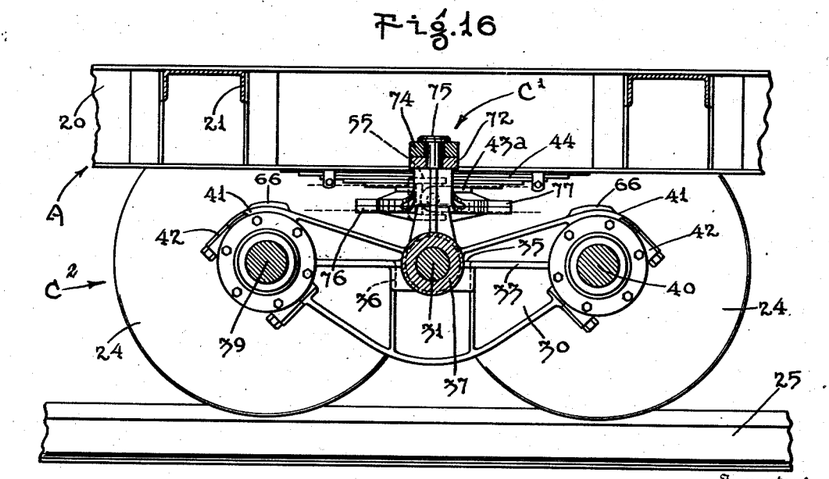
Fig. 16 is a vertical sectional view in detail taken as on the line 16—16 of Fig. 14 and including a portion of the car frame.
Figure 17:
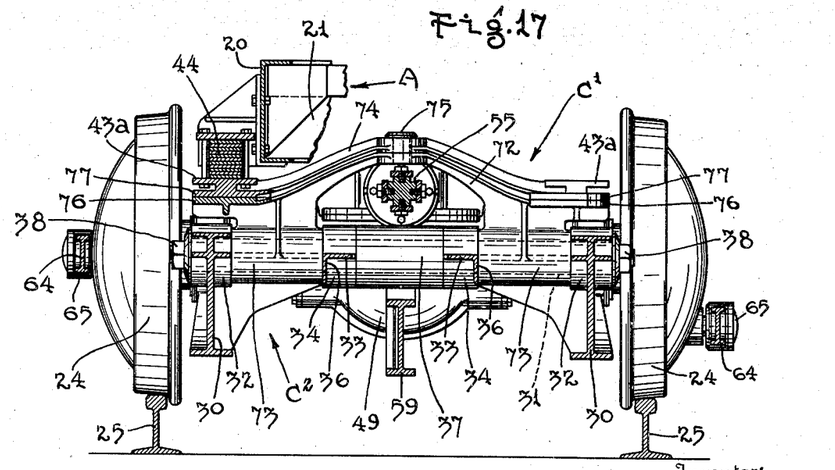
Fig. 17 is a vertical sectional view as on the line 17—17 of Fig. 14 and also including a portion of the car frame.

The drive-axle 39 of the truck is reversible end-for-end in the side frame members 30 thereof. The split bearings 41 on said frame members 30 readily provide for such reversal of parts and the portions of the attaching flange 61 on the opposite sides of the gear case 49 provide a means for attaching the torque arm 59 thereto in either disposition of the drive axle 39 relative to the side frame members 30. In the one relationship of the drive axle 39 in the truck frame (Figs. 1-12), the stub-shaft 51 extends from the gear case 49 in a direction away from the live axle 40, while in the other relationship of said drive axle 39, said stub-shaft 51 extends from the gear case 49 in a direction toward said live axle 40 (Figs. 13-17). A single non-swiveling drive truck, as shown in Figs. 1–5, or a single swiveled truck (Figs. 11, 12) may well be used with a long propeller shaft in a rail car of long wheel-base with the drive axle 39 in that relationship in the truck structure wherein the stub-shaft 51 extends from the gear case 49 in direction away from the live axle 40. However, when it is desired, such relationship of the drive axle 39 in the truck structure may be reversed, as above indicated. Such reversal of parts for close-coupling the drive truck C to a power take-off, through a short propeller shaft, will occur in a modified application of the form of our invention as shown in Figs. 1–5, and will also occur in the use of our swiveled drive truck, singly, or in pairs (Figs. 13–17). Each of the paired swiveled trucks C² shown in Figs. 13–15, is close-coupled through a short propeller shaft 29 with a power element 26ᵃ, one such element conveniently serving the two propeller shafts 29 and adapting the paired-truck arrangement to a short switching car (Fig. 13) readily capable of pulling relatively heavy loads along tracks of relatively great curvature.

When the drive axle 39 is reversed in the side frame members 30 of a swiveled truck C² so that the stub-shaft 51 extends from the gear case 49 in direction toward the live axle 40, the universal joint 55 on said stub-shaft 51 takes a position under the arched reach 72 of the fifth wheel support C¹ with the center of said joint 55 in the vertical axis of the king bolt 75 of said support. Thus, the telescoping and sidewise shifting of the propeller shaft 29 is wholly avoided and the short reach between the universal joints 28, 55 at the ends of said propeller shaft constantly maintained.

Changes in the specific form of our invention, as herein disclosed, may be made within the scope of what is claimed without departing from the spirit of our invention.

Having described our invention, what we claim as new and desire to protect by Letters Patent is:

1. In a traction vehicle, a main frame, a flexible drive truck having side frame members, a pair of axles with supporting wheels thereon and a load supporting shaft between said axles connecting said frame members for relative tilting movements, a fifth-wheel structure having a yoke with upper circle members thereon and a reach with lower circle members thereon, a kingbolt swively connecting said yoke and reach, springs on the upper circle members supporting the main frame, said reach being mounted on said supporting shaft and thereby hingedly carried on said truck, the axis of said kingbolt intersecting the axis of said shaft, a driving train for transmitting power to one of said axles, said train including a universal joint centered on the axis of said kingbolt adjacent to said supporting shaft.

2. In a vehicle, a main frame, a flexible truck including independently tiltable side frame members and a pair of axles with supporting wheels thereon, each side frame member having two bearings, one bearing journaled on one axle and the other bearing journaled on the second axle, a mounting journaled on one of said axles and carrying gearing for rotating the same, a torque arm issuing from said mounting and having a bearing thereon journaled on the other axle, said torque arm and mounting providing a tie which, through each axle, rigidly braces the other against fore and aft axial displacement at a point between said side frame members, said bearings on the side frame members and said bearing on said torque arm having predetermined tolerance accommodating misalignment of said axles, half-elliptic leaf springs, one for each side frame member of said truck, each spring being medially attached rigidly to its respective frame member medially thereof and at its ends to said main frame, each spring serving to stabilize the tilting movements of its respective side frame members, each end portion of each spring providing a stop adapted to be engaged by the corresponding end portion of its respective side frame member, said stops serving to limit the tilting of said side frame members within the range of tolerance of said side frame bearings and said torque arm bearing.

3. In a vehicle, a truck, a main frame mounted on the truck, said truck including independently tiltable side frame members and a pair of axles with supporting wheels thereon, each side frame member having two bearings, one bearing journaled on one axle and the other bearing journaled on the second axle, a mounting journaled on one of said axles and carrying gearing for rotating the same, a torque arm issuing from said mounting and having a bearing thereon journaled on the other axle, said torque arm and mounting providing a tie which, through each axle, rigidly braces the other against fore and aft axial displacement at a point between said side frame members, all of said bearings having predetermined tolerance accommodating misalignment of said axles, and stop means limiting the tilting of said side frame members within the range of tolerance of said side frame bearings and said torque arm bearing.

4. In a vehicle, a truck, a main frame mounted on the truck, said truck including independently tiltable side frame members and a pair of axles with wheels thereon flexibly supporting said side frame members, a mounting journaled on one of said axles and carrying gearing for rotating the same, a torque arm issuing from said mounting and having a bearing thereon journaled on the other axle, said bearing being self-aligning and of predetermined tolerance, the torque arm and mounting providing a tie which, through each axle, rigidly braces the other against fore and aft axial displacement at a point between said side frame members, half-elliptic leaf springs, one for each side frame member of said truck, each spring being medially attached rigidly to its respective frame member medially thereof and at its ends to said main frame, each spring serving to stabilize the tilting movements of its respective side frame member, each end portion of each spring providing a stop adapted to be engaged by the corresponding end portion of its respective side frame member, said stops serving to limit the tilting of said side frame members within the range of tolerance of said torque arm bearing.

5. In a vehicle, a truck, a main frame mounted on the truck, said truck including independently tiltable side frame members and a pair of axles with wheels thereon flexibly supporting said side frame members, a mounting journaled on one of said axles and carrying gearing for rotating the same, a torque arm issuing from said mounting and having a bearing thereon journaled on the other axle, said bearing being self-aligning and of predetermined tolerance, the torque arm and mounting providing a tie which, through each axle, rigidly braces the other against fore and aft axial displacement at a point between said side frame members, and stop means limiting the tilting of said side frame members within the range of tolerance of said torque arm bearing.

6. In a vehicle, a truck, a frame mounted on the truck, said truck including independently tiltable side frame members and a pair of axles with supporting wheels thereon, each side frame member having two self-aligning bearings, one bearing journaled on one axle and the other bearing journaled on the second axle, tie-rods connecting the wheels at either side of the truck, the connections between said tie-rods and their respective wheels being made through self-aligning bearings, a mounting journaled on one of said axles and carrying gearing for rotating the same, a torque arm issuing from said mounting and having a self-aligning bearing thereon journaled on the other axle, all of said self-aligning bearings having predetermined tolerance accommodating mis-alignment of said axles, and stop means limiting the tilting of said side frame members within the range of tolerance of said side frame bearings, torque arm bearing and tie-rod bearings.

7. In a vehicle, a truck, a frame mounted on the truck, said truck including independently tiltable side frame members and a pair of axles with supporting wheels thereon, each side frame member having two bearings, one journaled on one axle and the other journaled on the second axle, at least one of said two bearings being self-aligning, means for driving one of the wheels on one axle, a tie-rod connecting said wheel with the corresponding wheel on the other axle, at least one of the connections between said tie-rod and wheels being made through a self-aligning bearing, a tie-member connecting the two axles together, one of the axle and tie-member connections being made through a self-aligning bearing, said tie-member, through each axle, rigidly bracing the other against fore and aft axial displacement at a point between said side frame members, all of said self-aligning bearings having predetermined tolerance accommodating mis-alignment of said axles, and stop means limiting the tilting of said side frame members within the range of tolerance of said self-aligning bearings.

8. In a vehicle, a frame, a flexible truck having side frame members, a pair of axles with supporting wheels thereon, and a load-bearing shaft between said axles connecting said side frame members for relative tilting movements, a fifth-wheel structure having a reach with lower circle members thereon and a yoke with upper circle members thereon mounted on said lower circle members, a kingbolt swivelly connecting said yoke and reach, springs mounted on the upper circle members and supporting said frame, said reach being mounted on said load-bearing shaft and thereby hingedly carried on said truck.

9. In a vehicle, a frame, a flexible truck having side frame members, a pair of axles with supporting wheels thereon, and a load-bearing shaft between said axles connecting said side frame members for relative tilting movements, a fifth-wheel structure having upper and lower members swivelly connected together, and springs on the upper member supporting said frame, said lower member being mounted on said load-bearing shaft and thereby hingedly carried on said truck.

ARTHUR J. HERSEY.
CHARLES L. MADDEN.